United States Patent [19]

Kohl et al.

[11] Patent Number: 5,233,229

[45] Date of Patent: Aug. 3, 1993

[54] DEVICE FOR SUPPLYING VOLTAGE IN A MOTOR VEHICLE HAVING PARALLEL CONNECTED GENERATORS

[75] Inventors: Walter Kohl, Bietigheim; Rainer Mittag, Kornwestheim; Wenzel Novak, Bietigheim-Bissingen; Kai-Uwe Strasser, Hohen, all of Fed. Rep. of Germany

[73] Assignee: Robert Bosch GmbH, Stuttgart, Fed. Rep. of Germany

[21] Appl. No.: 816,828

[22] Filed: Jan. 3, 1992

[30] Foreign Application Priority Data

Mar. 19, 1991 [DE] Fed. Rep. of Germany ....... 4108861

[51] Int. Cl.$^5$ .............................................. H02J 7/14
[52] U.S. Cl. .................................. 307/10.1; 307/10.6; 307/84; 322/99; 340/455
[58] Field of Search ...................... 307/9.1, 10.1, 10.6, 307/10.7, 17, 16, 84, 78; 322/8, 90, 99; 320/48; 340/636, 662, 663, 455; 361/21; 290/46, 47

[56] References Cited

U.S. PATENT DOCUMENTS

| | | | |
|---|---|---|---|
| 4,336,485 | 6/1982 | Stroud | 307/84 X |
| 4,418,311 | 11/1983 | Torii et al. | 320/48 |
| 4,438,384 | 3/1984 | Akita et al. | 322/99 X |
| 5,097,165 | 3/1992 | Mashino et al. | 307/84 X |

FOREIGN PATENT DOCUMENTS 0232828 8/1987 European Pat. Off. .

Primary Examiner—A. D. Pellinen
Assistant Examiner—Fritz M. Fleming
Attorney, Agent, or Firm—Michael J. Striker

[57] ABSTRACT

A device for supplying voltage to at least one consuming device in a motor vehicle including two parallel generators, two voltage regulators associated with each of the generators, two batteries each connected with one of the voltage regulators, a starter switch connected with at least one of the batteries and the voltage regulators, a charge control lamp for signalling connected with the starter switch and the voltage regulators, switching device for electrically connecting and disconnecting the consuming device or devices, and devices for controlling the voltage regulators so that during starting the charge control lamp indicates starting and the switching device disconnects the consuming devices and if a defect occurs in either generator-voltage regulator system, the charge control light lights and the consuming device or devices is (or are) supplied with current, even if, for example, one of the generators fails. The device for supplying voltage advantageously includes a switch device having four diodes, the anodes of two diodes (D1,D2) being connected with each other and the charge control lamp and the cathodes of the two diodes (D1,D2) being each connected to a different voltage regulator, and the cathodes of the other two diodes (D3,D4) being connected with each other and the switching device (13).

13 Claims, 1 Drawing Sheet

DEVICE FOR SUPPLYING VOLTAGE IN A MOTOR VEHICLE HAVING PARALLEL CONNECTED GENERATORS

BACKGROUND OF THE INVENTION

The present invention relates to a device for supplying voltage in a motor vehicle with parallel connected generators.

A device for supplying voltage of this type is known and includes the generators and connected voltage regulators, at least one battery one of whose terminals is connectable via a starter switch with the voltage regulator, and a charge control device which is connectable with both the starter switch and the voltage regulators and also via switching means with the negative terminal of the battery, also advantageously connected to ground.

The production of electrical energy for vehicle power supply occurs advantageously with a vehicle alternator, whose output voltage is adjusted and set with a connected voltage regulator to a value required in the power supply network. Since the demands on the power supply system in a modern motor vehicle are very high, generator systems were proposed which have two parallel connected generators.

For example, it is known from Published European Patent Application 232 828 A2 to use two alternators each with its own voltage regulator for charging two batteries connected in series. Thus both voltage regulators are connected with each other by the charge control lamp and the charge control lamp can be connected with the batteries by the starter switch.

In known generator systems voltage is applied to the charge control lamp after operation of the starter switch so that it is illuminated. Furthermore if the starter is operated, after conclusion of the starting process a voltage is induced in a known way, with whose help the batteries are charged and which puts out the charge control light.

This known arrangement has the disadvantage that defects occurring during operation are not indicated and resulting short circuits can cause damage to one of the generators and also can impair the operation of the other generator.

A voltage regulator or device for supplying voltage is also known and used currently in various motor vehicles, in which the charge control lamp is used to indicate the starting process and defects in the system as they occur. One such arrangement is shown in FIG. 1. Each voltage regulator has an integrated circuit or integrated circuit means connected to the bases of two transistors whose collectors are directly connected with each other and the transistors are connected in parallel with the battery supplying current when the starter switch is closed. In this device, when the starter switch is closed, the charge control lamp lights, and the consuming devices are disconnected from the battery by a relay switch. In normal operation the charge control lamp is shut off and the consuming devices connected. If a defect occurs during normal operation however, the charge control lamp lights signalling the defect to the operator.

SUMMARY OF THE INVENTION

It is an object of the present invention to provide a device for supplying voltage in a motor vehicle having parallel connected generators of the above described type, in which the above-mentioned disadvantages are eliminated.

This object, and others which will become more apparent hereinafter, are attained in a device for supplying voltage in a motor vehicle comprising at least two parallel connected generators, a starter switch, voltage regulators connected with each of the generators, at least one battery one of the terminals of which being connected by the starter switch with one of the voltage regulators and a charge control device for signalling, preferably a charge control lamp, connected between the starter switch and the voltage regulators and also connectable by switching means, preferably a relay activated with the starter switch, with the negative terminal of the battery.

According to the invention the device for supplying voltage also includes a switch device connected electrically between the charge control device and the switching means and also connected electrically between the voltage regulators. This switch device has a plurality of components conducting current in one direction and blocking current in another direction and advantageously the switch device consists of four diodes. The anodes of two of the diodes are connected with each other and the charge control device and the cathodes of the two diodes are each connected to a different voltage regulator. The cathodes of the other two diodes are connected with each other and the switching means and the anodes of the other two diodes are each connected with one of the voltage regulators.

In a preferred embodiment of the invention, each of the voltage regulators includes two transistors, one voltage regulator contains a first and second transistor and the other voltage regulator contains a third and fourth transistor. The collectors of the first and second transistors of the one voltage regulator are connected electrically with each other and the collectors of the third and fourth transistors of the other voltage regulator are connected electrically with each other and the collectors of both of the voltage regulators are connected to each other through the switch device, advantageously the anodes of the other diodes are connected with the collectors of the respective voltage regulator. Advantageously the cathodes of the other diodes are connected electrically to the consuming device or devices via the relay and the charge control device is connected to the anodes of the first mentioned diodes. Furthermore, the charge control device, the switch device and the consuming device and relay, which advantageously are connected in series, are preferably connected as a group in parallel with the two transistors in both voltage regulators and to the emitters of both transistors. A second battery can also be connected with the additional voltage regulator.

Means for controlling potentials at the bases of the transistors are advantageously provided in the voltage regulators. The means for controlling the potentials advantageously activates the charge control device to indicate starting when the starter switch is closed and the switching means disconnects the consuming device, and also it shuts off the charge control device and connects the consuming device or devices with the battery, when normal operation without defects commences.

The device according to the invention has the advantage that by using two generators a higher electrical power can be produced and by suitably connecting both generators and/or voltage regulators with a single indicator, e.g. the charge control lamp, defects occurring in one of the generator-voltage regulator systems can be indicated and simultaneously the other generator-voltage regulator system operates simultaneously without problem. Means for signalling that a defect has occurred are provided as well as means for continuing operation of the consuming devices when the defect occurs.

By the advantageous features of the invention it is guaranteed that all consuming devices, especially also those which are first connected after starting, also can be supplied with voltage, when one of the generator-voltage regulator systems is defective.

An additional advantage is that two identical voltage regulators can be used to make a single control voltage, while in other advantageous embodiments two different voltage regulators and different generators can be used so that two different control voltages are possible.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE PREFERRED EMBODIMENT

Figure 1:
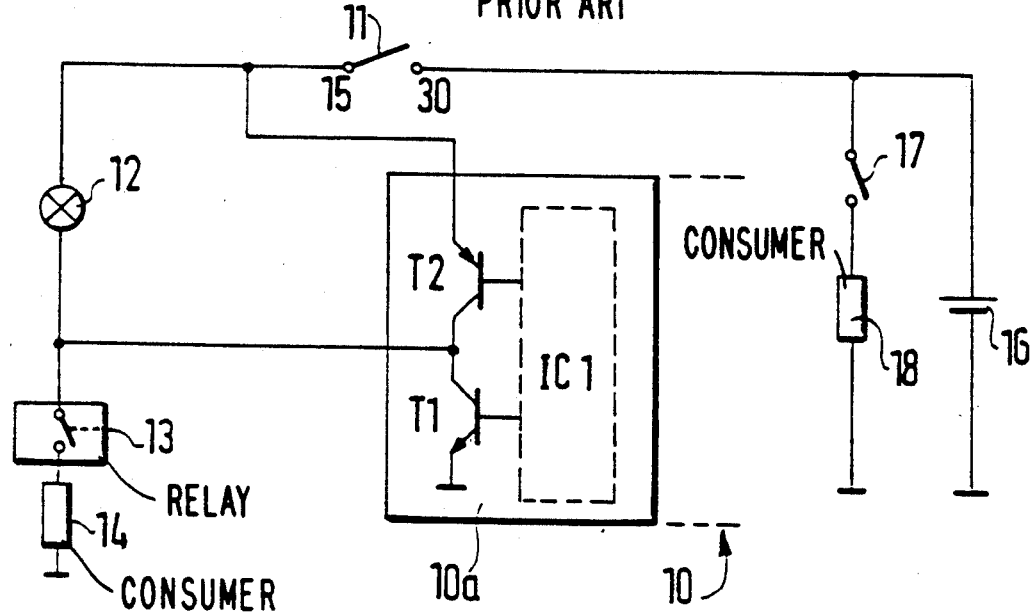
FIG. 1 is a schematic circuit diagram of a currently known device for supplying voltage in a motor vehicle.

A device for supplying voltage currently used in various motor vehicles is shown in FIG. 1. This prior art device however has only one generator associated with it. In this arrangement the generator-voltage regulator unit 10 has a voltage regulator 10a. In this unit among other components there are two transistors, first and second transistor T1 and T2, whose bases are connected electrically with an integrated circuit means IC1. Moreover the collectors of the first and second transistors T1 and T2 are connected with each other and the emitter of the first transistor T1 is connected to ground and the emitter of the second transistor T2 is connected with terminal 15 of the starter switch 11.

The charge control device and/or the lamp 12, which is connectable via a relay 13 with consuming devices 14, is connected electrically between the terminal 15 of the starter switch 11 and the collectors of the first and second transistors T1 and T2.

Terminal 30 of the starter switch 11 is connected with the positive terminal of a battery 16 and can be connected by a switch 17 with additional consuming devices 18.

After closing the starter switch 11, the charge control lamp 12 is connected with the positive pole or terminal of the battery 16, current flows through the conducting first transistor T1 and the charge control lamp 12 lights during this starting process. The consuming devices 14, which should not be supplied with voltage during the starting process, are separated from the remainder of the circuit, since the second transistor T2 is nonconducting during the starting process and the relay 13 breaks the connection to the consuming devices 14.

After the starting process has been finished, the second transistor T2 is conducting and the first transistor T1 is nonconducting so that the charge control lamp 12 is put out and the relay 13 closes so that the consuming devices 14 are supplied with voltage.

The control of the first and second transistors T1 and T2 occurs either by integrated circuit means IC1, which is part of the voltage regulator, or by changes of potential at their bases which depend on whether the circuit is in the starting or normal operating state.

When a defect occurs, e.g. when during the travel of the vehicle the generator drive belt breaks, the first transistor T1 is switched into its conducting state and the second transistor T2 into its nonconducting state so that the charge control lamp 12 is lighted and the defect is indicated.

However the generator-voltage regulator system shown in FIG. 1 includes only one generator and can not provide the power demands in a vehicle with many power supply components required to produce high power.

Figure 2:
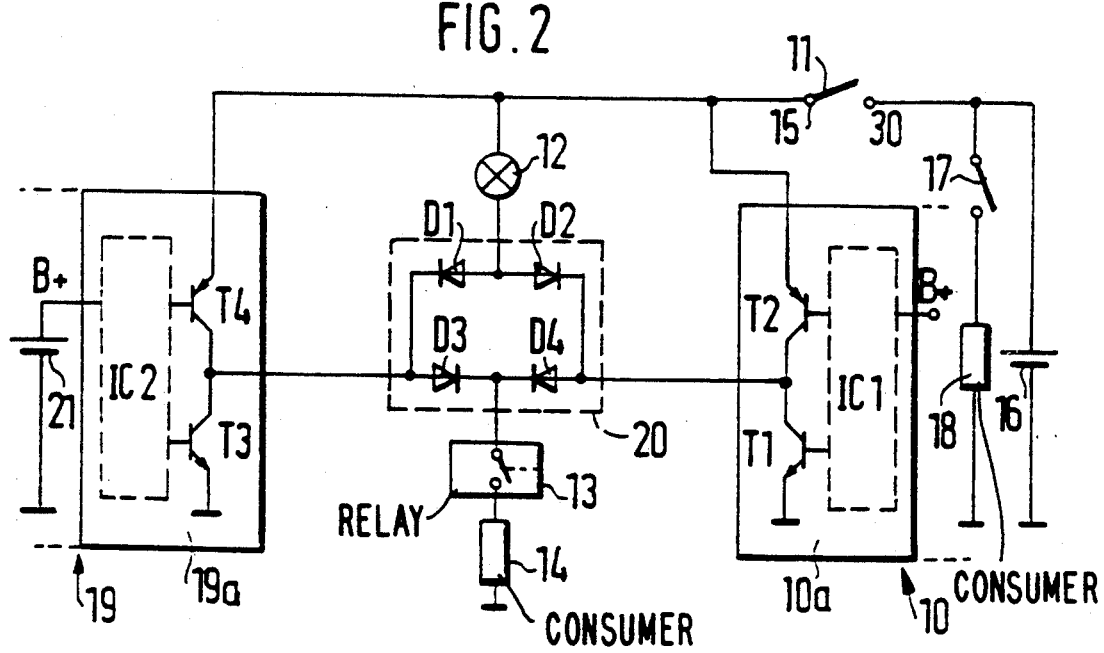
FIG. 2 is a schematic circuit diagram of a device for supplying voltage in a motor vehicle according to the invention.

An embodiment of the generator-voltage regulator system according to the invention shown in FIG. 2 includes the components, which are shown as part of the prior art embodiment in FIG. 1, which have the same function as in FIG. 1 and which also are given the same reference number as in FIG. 1. The components which are the same and have been described are not described in detail in connection with the embodiment of the invention shown in FIG. 2. The generator-regulator system 19 is provided in the device of FIG. 2 with the voltage regulator 19a which has another terminal B+.

Furthermore the second generator-regulator system 19 has third and fourth transistors T3 and T4 and an integrated circuit means IC2 not shown in further detail in the drawing. The third and fourth transistors T3 and T4 of the voltage regulator 19a are connected between the starter switch 11 and ground, like the first and second transistors T1 and T2. The switch device 20 is connected electrically between the emitters of the transistors T1 and T2 as well as T3 and T4. This switch device 20 is also connected with the charge control lamp 12 and the relay 13. The switch device 20 has four diodes D1, D2, D3 and D4. The anodes of the diodes D1 and D2 are connected with each other and the charge control device 12 and the cathodes of the diodes D3 and D4 with each other and the relay 13 which serves as switching means. Likewise the other sides (i.e. cathode of diodes D1 and anode of diodes D3) of the diodes D1 and D3 are connected with the collectors of the transistors T3 and T4 and the diodes D2 and D4 are connected with the collectors of the transistors T1 and T2. Instead of the diodes other controllable semiconductor devices, particularly transistors, are usable.

The generator-voltage regulator system 19 can be connected in a broadened embodiment by a terminal B+ to a second battery 21, in which case the system 19 and the battery 21 can be designed for a voltage other than that of system 10. For example the system 10, 16 can be designed for 12 to 14 v, while the system 19, 21 can be designed for 24 to 28 volts. It is conceivable however to provide other values of voltage.

After closing the starter switch 11 the charge control device 12 is connected with the positive terminal of the battery 16 and current flows through the charge control device 12, the diodes D1 and D2 and the transistors T1 and T3. The charge control lamp 12 lights and indicates the starting process. After the starting process occurs the generators produce an initial voltage, which switches transistors T2 and T4 from the nonconducting to the conducting state so that the charge control device or light is put out. Simultaneously the transistors T1 and T3 are switched into the nonconducting state. Thus a current flows through the closed starter switch 11, the transistors T2 and T4 and the diodes D4 and D3 in the relay 13, which closes and/or already has been closed and supplies the consuming devices 14 with voltage.

In the normal operating state, both generator-voltage regulator systems 10, 19 operate in such a way that the charge control device or light 12 remains shut off.

Should a defect occur in the system, it is detected in the voltage regulator and the transistor T1 or the transistor T3 is put into its conducting state according to the location of the defect, i.e. in the generator-voltage regulator system 10 or 19. Current then flows through the charge control device, the diode D2 and the transistor T1 or, in the other case, through the diode D1 and the transistor T3, so that in both cases the charge control device or light 12 is lighted and the defect is indicated.

In the remaining generator-voltage regulator system which is without defect the transistor T2 or the transistor T4 conducts and the diode D1 or the Diode D2 blocks off the unaffected generator-voltage control unit.

Since only the diode D1 or D2 must receive the current flowing through the charge control device 12, comparatively simple signal diodes can be used. The diodes D3 or D4 must, in contrast, conduct half or the entire current, which is needed for the consuming devices 14. The diode D3 or D4 can be selected so that they can conduct currents of a few amperes.

The charge control device 12 can be a lamp, light emitting diode LED or an LCD indicator It is also conceivable to use other optical or acoustic devices.

The switching means 13 is usually a relay however it is also conceivable to use a transistor.

The currently unillustrated control of the transistors T1 to T4 occurs in the standard way by changing the potential at the base. The control can occur likewise with the help of appropriate integrated circuits IC1 and/or IC2 and should not be explained in detail here.

It will be understood that each of the elements described above, or two or more together, may also find a useful application in other types of constructions differing from the types described above.

While the invention has been illustrated and described as embodied in a device for supplying voltage in a motor vehicle having parallel connected generators, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters patent is set forth in the appended claims.

We claim:

1. In a device for supplying voltage to at least one consuming device in a motor vehicle, said device for supplying voltage comprising at least two parallel connected generators, a starter switch, voltage regulators associated with each of said generators, at least one battery with a positive terminal and a negative terminal, one of said terminals of said battery being connected by said starter switch with one of said voltage regulators and a charge control device for signalling connected between said starter switch and said voltage regulators and also connectable by switching means with the negative terminal of the battery, the improvement comprising a switch device (20), said switch device (20) being connected electrically between the charge control device (12) and the switching means (13) and also connected electrically between the voltage regulators (10, 19), said switch device (20) having a plurality of components conducting current in one direction and blocking current in another direction, wherein said components being four diodes (D1, D2, D3, D4), each of said diodes having an anode and a cathode, and the anodes of two of said diodes (D1, D2) being connected with each other and the charge control device (12) and the cathodes of the two diodes (D1, D2) being each connected to a different one of the voltage regulators, and the cathodes of the other two of said diodes (D3, D4) being connected with each other and the switching means (13) and the anodes of the other two diodes (D3, D4) also being each connected to a different one of the voltage regulators (10, 19).

2. The improvement as defined in claim 1, wherein the switching means (13) is connected with the negative terminal of the battery (16) via the at least one consuming device.

3. The improvement as defined in claim 1, wherein the switching means (13) is a relay.

4. The improvement as defined in claim 1, wherein the cathodes of the other two diodes (D3, D4) are directly connected electrically with the at least one consuming device (14) via the switching means (13).

5. The improvement as defined in claim 1, wherein each of the voltage regulators (10, 19) includes two transistors (T1, T2; T3, T4), each of said transistors having an emitter, a base and a collector, said collectors of said transistors (T1, T2) of one of the voltage regulators being connected electrically with each other and said collectors of the transistors (T3, T4) of the other of the voltage regulators being connected electrically with each other and said collectors of both of said voltage regulators being connected via the switch device (20).

6. The improvement as defined in claim 5, wherein each of the voltage regulators (10, 19) has integrated circuit means (IC1, IC2) connected with said bases of said transistors in the voltage regulator so that potentials at said bases of said transistors control current flowing through said switching device (20).

7. The improvement as defined in claim 5, wherein each of said voltage regulators is structured so that control of said transistors in said voltage regulator is such that one of the transistors in said voltage regulators is in a conducting state during starting and the other of said transistors in said voltage regulator is blocking during starting and after starting is conducting.

8. The improvement as defined in claim 7, wherein said one of said voltage regulators (10) is structured so that, on occurrence of a defect associated with said one of said voltage regulators and said generator connected therewith, one of said transistors (T1) of said one of said voltage regulators (10) is put in a conducting state, and said other of said voltage regulators (19) is structured so that, after occurrence of a defect associated with said other of said voltage regulators and said generator connected therewith, one of the transistors (T3) of said other voltage regulator (19) is put in a conducting state.

9. The improvement as defined in claim 8, further comprising an additional battery (21), said additional battery (21) being connected to the other of said voltage regulators.

10. The improvement as defined in claim 8, wherein said voltage regulators (10, 19) are designed to provide different voltages.

11. In a device for supplying voltage to at least one consuming device in a motor vehicle, said device for supplying voltage comprising a generator; a voltage regulator connected with said generator and having a first transistor and a second transistor, each of said first and second transistors having an emitter, a collector and a base, said collectors of said first and second transistors being connected electrically with each other; a starter switch and a battery having a positive terminal and a negative terminal connected in series with said starter switch; said starter switch and said battery being connected to both of said emitters of said first and second transistors; a charge control device connected between the emitter of one of the first and second transistors and the collectors of the first and second transistors; switching means connecting said at least one consuming device with the negative terminal of said battery and also with said charge control device and said collectors of said first and second transistors; and means for controlling potentials at said bases of said first and second transistors so that, during starting when said starting switch is closed, said charge control device indicates starting and said switching means disconnects said at least one consuming device, and also so that during normal operation without a defect present said charge control device is shut off and said switching means connects said at least one consuming device with said battery, the improvement comprising another generator; another voltage regulator connected electrically with said other generator and having a third transistor and a fourth transistor, each of said third and fourth transistors also having an emitter, a collector and a base, said collectors of said third and fourth transistors being connected electrically with each other; said starter switch and said battery also being connected to both of said emitters of said third and fourth transistors; another battery connected to said other voltage regulator and to said at least one consuming device; a switch device consisting essentially of four diodes, each of said diodes having an anode and a cathode, said anodes of two of said diodes being connected to each other and the charge control device and said cathode of one of said two diodes being connected to said collectors of said first and second transistors and said cathode of the other of said two diodes being connected to said collectors of said third and fourth transistors, and said cathodes of the other two of said diodes being connected electrically with each other and with the switching means (13) and said anode of one of said other two diodes being connected electrically with said collectors of said first and second transistors and said anode of the other of said other two diodes being connected electrically with said collectors of said third and fourth transistors; and means for controlling potentials at said bases of said third and fourth transistors so that, if a defect occurs during normal operation, said charge control device indicates said defect and said at least one consuming device is supplied by at least one of said batteries.

12. The improvement as defined in claim 11, wherein said charge control device is a charge control lamp.

13. The improvement as defined in claim 11, wherein said switching means is a relay.

* * * * *